Nov. 16, 1926.

C. E. MAYNARD

TIRE BEAD

Filed Dec. 11, 1922

1,606,885

Rubberized Felted Fibers

Rubberized Felted Fibers

INVENTOR
Charles Edgar Maynard
BY
ATTORNEY

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

TIRE BEAD.

Application filed December 11, 1922. Serial No. 606,038.

My invention relates to the construction of the bead portions of tire casings. It has for its object the provision of a bead filler which will adhere in a better manner to the remaining structure of the casing, and at the same time is cheaper in construction than fillers previously proposed.

The invention will now be described in connection with the accompanying drawings in which—

Figure 1:
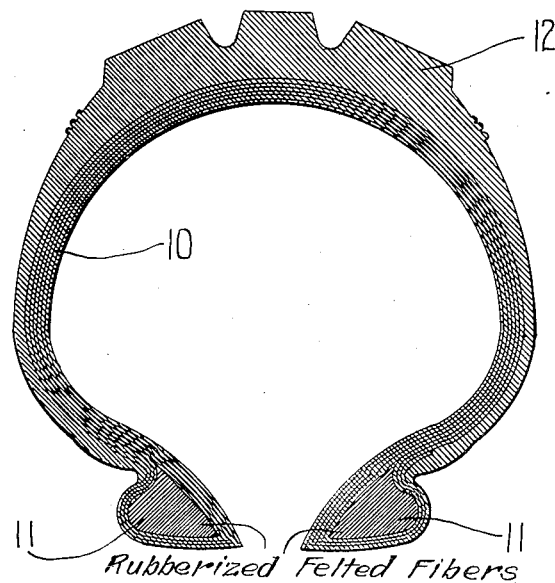
Figure 2:
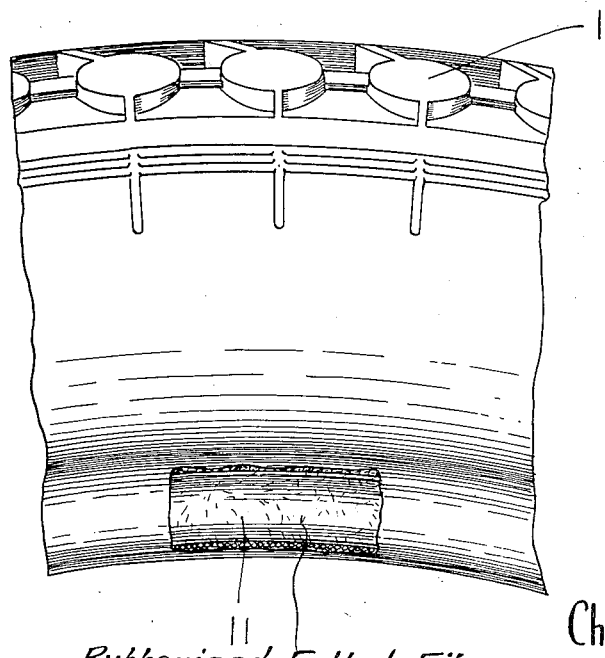

Fig. 1 is a cross section of a tire casing in which my invention may be embodied, shown in this instance as being of the clincher type; and Fig. 2 is a fragmentary side elevation of the tire, partially broken away to show the bead filler.

I have illustrated the invention as applied to tire casings of the clincher type having a fabric carcass portion 10, anchored at the edges by annular bead fillers 11 of a suitable form to give shape to the tire bases. The tire is surmounted by a tread 12 of any desired form. It has been customary to form the bead fillers of a semi-hard rubber wrapped with a layer of rubberized fabric, which is buffed and cemented before the filler is built into the tire casing. It has also been proposed to build up the tire bead out of rolled up rubberized fabric. This fabric is expensive, and particularly in the latter case makes a bead filler that is relatively stiff and unyielding without proportionately increasing its tensile strength.

I have found that by using as a material for the bead filler a mixture of fibre and rubber with the fibres long enough and sufficient in number to furnish an improved bond between the filler and carcass material, and to increase the tensile strength of the filler itself while giving sufficient elasticity to permit the application of the tire to the rim, improved results may be obtained. This material is preferably made by grinding scrap rubberized fabric, preferably unvulcanized, the grinding process being stopped at a point where the rubber and fibre are well mixed and the woven nature of the material is destroyed, but before the fibres have had their strength and felting qualities destroyed. When the material has been prepared in this manner, it will be found that the entire body of the rubber will be well permeated by fibres which will give to the bead filler a uniformly increased tensile strength, and will give to the surface of the bead filler a distinct fibrous or felt-like appearance. This bead filler may be incorporated into a tire casing without any fabric wrapping, the bond between the bead filler and the carcass being very greatly strengthened by these felted fibres on the surface of the filler felted and plastered directly to the rubberized carcass plies. As much trouble in the wearing of tires is caused by loosening of the bead filler in the carcass, it will be seen that this strengthened bond between the filler and the carcass will greatly augment the life of tire casings.

Having thus described my invention, I claim:

In a tire casing, a carcass portion of textile material, and a bead filler vulcanized thereto composed of rubber and unwoven felted fibres, the fibres being long enough to preserve their fibrous nature and to give added tensile strength and bonding capacity to the filler material, the material of the bead filler being in direct contact with the strain-resisting portion of the tire carcass, whereby the use of a fabric covering upon the bead filler is avoided and the bond between the bead filler and the strain-resisting portion of the tire carcass is increased.

CHARLES EDGAR MAYNARD.